May 31, 1960     C. K. GRAVLEY     2,939,059
CAPACITOR OF HIGH PERMITTIVITY CERAMIC
Filed March 21, 1955

*INVENTOR.*
CHARLES K. GRAVLEY
BY *Harries A. Mummah*
ATTORNEY

United States Patent Office 2,939,059
Patented May 31, 1960

2,939,059

CAPACITOR OF HIGH PERMITTIVITY CERAMIC

Charles K. Gravley, Willoughby, Ohio, assignor to Clevite Corporation, Cleveland, Ohio, a corporation of Ohio Filed Mar. 21, 1955, Ser. No. 495,665

4 Claims. (Cl. 317—242)

This invention relates to electrical capacitors of the type in which electrical energy is stored in, or near electroded surfaces of, a body of a solid dielectric material, and more particularly to such capacitors of high permittivity ceramic material. The word "permittivity," as used hereinbelow, is taken to be the permittivity, or dielectric constant, of the material relative to the permittivity of space.

This application is a continuation-in-part of my copending application for U.S. Letters Patent Serial No. 343,054, matured to Patent No. 2,841,722, and assigned to the same assignee as is the present invention.

It has been proposed to drill a few holes through the central portion of a block of quartz and place electrode structures inside the holes and on external surfaces of the block, so that application of electrical potentials between the electrode structure in the holes and the external electrodes causes mechanical distortions in the block by virtue of the piezoelectric responses exhibited by the quartz in the form of a single crystal. Electrical capacitors also have been proposed of glass or of plastic materials in which two or three small wires are embedded in the material to provide between the wires an electrical capacitance of a very small but accurately determined value. It also has been proposed to form certain ceramic raw materials into ceramic bodies having a number of sizable holes, such bodies being used, for example, as heat exchangers. In spite of such proposals, however, the only practically useful ceramic capacitors hitherto known to the art are formed by providing electrodes either on the opposed surfaces of a ceramic plate or disk or on the inner and outer surfaces of a simple tubular ceramic body. Because of the frangible nature of ceramic materials and of the difficulty of forming extremely thin ceramic shapes, conventional ceramic capacitors of the types just mentioned have rather thick walls between the electrodes thereof, with the result that, in physical sizes suitable for use in the usual electronic circuits, such ceramic capacitors have capacitances in the low micromicrofarad ranges with rather high D.-C. working voltage ratings. Thus conventional ceramic capacitors would be very bulky if designed for capacitances within the approximate range of 0.1 to 10.0 microfarads.

It is an object of the present invention, therefore, to provide a new and improved capacitor of solid dielectric material, in the form of high permittivity ceramic material, which avoids one or more of the above-mentioned disadvantages of the prior art devices.

It is another object of the invention to provide a new and improved capacitor of high permittivity ceramic material having at given D.-C. working voltage ratings a high value of capacitance per unit volume as compared with prior art capacitors of the non-electrolytic types.

It is a further object of the invention to provide a new and improved ceramic capacitor which is capable of production at costs comparable, for given capacitance and working voltage ratings, with the cost of production of capacitors of the type made up of strips of paper and metal foil or of metallized paper.

It is still another object of the invention to provide new and improved capacitors of high permittivity ceramic material which combine relatively thin dielectric layers between the electrode structures thereof with adequately high mechanical strengths.

In accordance with the present invention, a capacitor of high permittivity ceramic material comprises a noncomposite body of such material fired to ceramic maturity and having numerous parallel holes of capillary cross-sectional dimensions in the material. This capacitor further comprises electrode structure associated with the ceramic body, including conductive material affixed to the interior surfaces of the holes to provide numerous parallel internal electrodes, as well as terminal lead connections to this electrode structure, including the internal electrodes, connecting at least one terminal lead individually to a large number of the internal electrodes, for applying electrical potentials across the electrode structure to store electrostatic energy in regions of the high permittivity ceramic material adjacent to the holes.

In accordance with a feature of the invention, the non-composite ceramic body of the capacitor has a plurality of generally circular parallel capillary holes arranged in a layer, these holes being so closely spaced that the lateral distance between adjacent holes in the layer is less than the average diameter of the capillary holes, and the conductive electrodes in these holes being interconnected to form effectively an internal layer electrode.

In accordance with another feature of the invention, the noncomposite ceramic body of the capacitor has a plurality of parallel holes of generally rectangular cross-sectional shape, the holes being of capillary size in the smaller internal dimension thereof so that they are adapted to receive conductive electrode material in fluent form, and conductive material being inserted in the holes to provide a plurality of parallel internal electrodes.

For a better understanding of the present invention, together with other and further objects thereof, reference is had to the following description taken in connection with the accompanying drawing, and its scope will be pointed out in the appended claims.

In the drawing, Fig. 1 is a perspective view of a capacitor embodying the present invention and including a ceramic body and electrode structure;

Figures 3, 4:
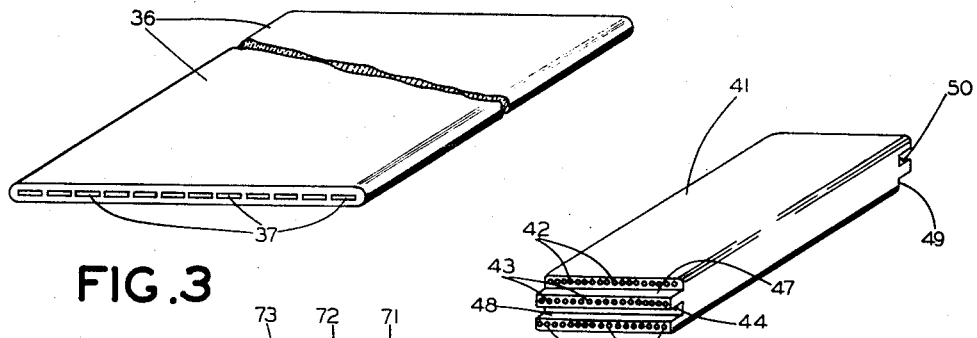
Fig. 3 is a perspective view representing a modified arrangement somewhat similar to that shown in Fig. 1, including a modified ceramic body with part of its length cut away but without showing the electrode structure.
Fig. 4 is a perspective view of a ceramic body suitable for use as the dielectric material in another embodiment of the ceramic capacitor of the present invention.
Figure 6:
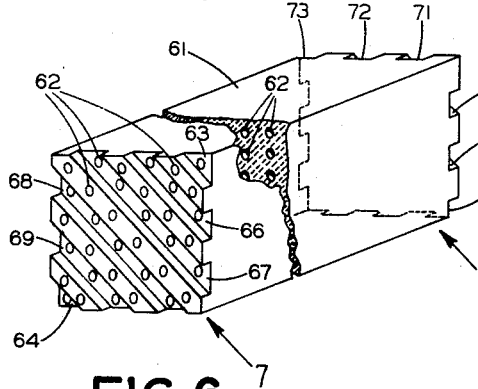
Figure 7:
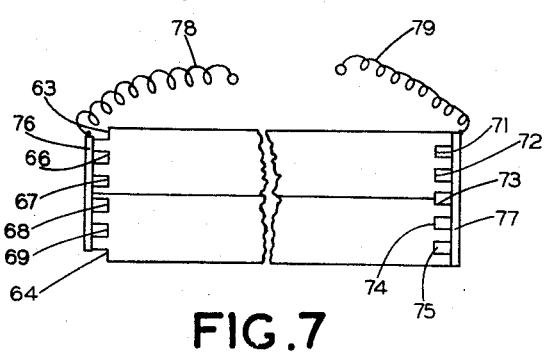

Fig. 6 is a perspective view, with its length partially cut away, of a ceramic body of a type related to that illustrated in Fig. 4 but adapted to have a modified arrangement of its electrodes; and Fig. 7 is another view of the body illustrated in Fig. 6, taken looking in the direction designated 7, 7 in Fig. 6, which is perpendicular to the length direction of the body and looking diagonally upward from the lower right-hand edge toward the upper left-hand edge as viewed in Fig. 6, the view of Fig. 7 being provided to illustrate the lead connections to the electrodes with which that body is furnished.

Figure 1:
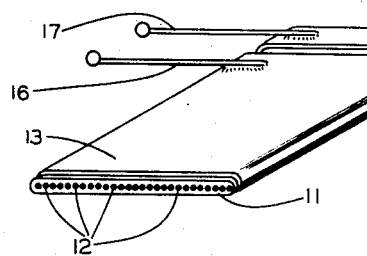

Referring now more particularly to the drawing, there is illustrated in Fig. 1 a capacitor of high permittivity ceramic material comprising a noncomposite body 11 of such material fired to ceramic maturity. This body has numerous parallel holes 12 of capillary cross-sectional dimensions in the ceramic material. These numerous parallel holes preferably are arranged in at least one layer, and specifically, in the form illustrated in Fig. 1, they are arranged in a single layer of more than two dozen holes.

The permittivities of most solid materials lies in the range of 2 to 10. Most of the ceramic materials of the types known to the art prior to the present century have permittivities within the range of 5 to 8. Shortly after the turn of the century, however, the exceptionally high permittivity of the rutile crystalline modification of titania, $TiO_2$, was determined to be of the order of 100, and a value of 110 for a fired rutile ceramic body was recorded about 1912. While several ceramic materials are known which have permittivities substantially greater than 10 but substantially less than 100, it has become customary in the art during recent decades to consider a solid material having a permittivity of about 100 or higher to be a high permittivity material. Among ceramic materials which may be classed with rutile as high permittivity materials may be mentioned several whose permittivities were determined more recently, notably calcium titanate and strontium titanate, having values of about 165 and 275 respectively. It should be mentioned also that these are room temperature values; the permittivity of strontium titanate, for example, increases rather rapidly as the temperature is lowered and reaches much higher values at very low temperatures.

Other ceramic materials consisting primarily of a titanate salt also are known now to have remarkably high permittivities, some of them at room temperature. Notable among these materials is barium titanate, which has a permittivity somewhat higher than 1,700 at room temperature. Although the permittivity of barium titanate ceramic falls as low as about 1,600 at 60° C. and rises above 2,000 as the temperature either falls several degrees below room temperature or rises above about 90° C., its value of about 1,700 at room temperature can be taken as representative of its permittivity within the range of temperatures ordinarily encountered. It is true, of course, that at higher temperatures, above 100° C., its permittivity increases rapidly with temperature, reaching a peak of about 6,000 at about 120° C. Barium titanate formulations containing increasing amounts of strontium titanate in solid solution exhibit peak permittivities at successively lower temperatures, and a peak value in excess of 10,000 can be obtained at room temperature. Such peak values, however, are not sustained under temperature variations, and the permittivities tend to drop sharply as the temperature varies more than 10° or 20° in either direction.

Various additions to barium titanate produce relatively flat temperature-permittivity characteristics in the range of temperatures normally encountered. For example, barium titnate containing about 4% by weight of barium stannate has a permittivity of about 2700 over the temperature range from room temperature to 60° C., while addition instead to the barium titanate of 4% lead titanate by weight provides a permittivity within the range of approximately 800 to 1,000 at temperatures between 0° and 100° C. Other ceramic materials which may be mentioned in this connection are potassium niobate, having a permittivity of the order of 500, and modified titanate salts in the form of lead zirconate-lead titanate solid solutions within the range of about 50 to 60 mole percent of lead zirconate, having permittivities of about 400 to 700 depending on composition; these materials show relatively small variations as the temperature is raised from room temperature to 100° C. or higher.

Thus it appears that ceramic materials having high permittivities, which may be even one or more orders of magnitude higher than the permittivity of rutile, now are available. Certain compositions based on barium titanate are considered preferable for this purpose, and additions of only a few percent of some metallic oxides have the tendency to suppress variations of permittivity as the temperature changes from temperature. One particularly advantageous composition is comprised essentially of 10% calcium zirconate, 10% strontium titanate, and 80% barium titanate by weight. This last ceramic composition affords a permittivity of about 6,500 at room temperature and for many purposes represents a good compromise between permittivity level and flatness of the permittivity-temperature characteristic. In preparing such a composition, the commercially available salts of the three components, of a grade suitable for electrical use, are ground to a fine powder and thoroughly mixed, preferably in a ball mill. After forming in the desired shape, the raw ceramic bodies are heated in a furnace to the ceramic-firing range and may be fired to ceramic maturity by being held for about one hour at temperatures in the range between 1,300° and 1,400° C.

Reference may be had to aforementioned U.S. Patent No. 2,841,722 for illustrations of a variety of shapes of noncomposite bodies having numerous holes of capillary cross-sectional dimensions. These bodies contain a plurality of holes which may be, for example, generally circular or generally rectangular in cross-sectional shape, and the smallest dimension of the holes preferably is kept below about 0.015 inch.

Several methods are available of forming such noncomposite bodies, which have no pronounced interfaces in the ceramic portions surrounding the holes, and some of these methods involve machining operations which are quite tedious and expensive. However, a very expedient method of forming such bodies is described and claimed in my copending application for U.S. Letters Patent Serial No. 343,055, matured to Patent No. 2,875,501, and assigned to the same assignee as is the present invention. As therein described and claimed, a group of long, unrefractory filaments or strips is pulled through a liquid coagulating agent and then through a dispersion of ceramic raw material while maintaining the spacing of the several filaments or strips so that, when the ceramic material has coagulated around, between, and over the filaments or strips, a long unitary body is formed. This long body has considerable green strength and easily is handled and cut into sections of desired lengths. The filaments or strips burn out during the ceramic-firing, leaving the desired elongated parallel holes in the ceramic sections. Since the holes are of capillary widths, a suspension of finely divided conductive materials, such as silver or carbon, in a suitable liquid may be introduced into each hole by capillary action and then dried to form electrodes therein. Efficient methods of handling and electroding the sections of ceramic material of the shapes in question are described and claimed in my copending application for U.S. Letters Patent Serial No. 343,056, matured to Patent No. 2,861,320, and assigned to the same assignee as is the present invention.

By using the methods mentioned hereinabove, the holes 12 in the body 11 may be arranged in a layer having a remarkably large number of small and very closely spaced holes. When the holes are generally circular in cross-sectional shape it is preferred that the average diameter of the holes after the ceramic-firing operation be about 0.004 to 0.008 inch and that the holes in the layer of holes be so closely spaced that the lateral distance between the adjacent holes in the layer is less than the average diameter of the capillary holes. In general, the lateral distance between the holes is maintained less than 0.15 millimeter, or less than about 0.005 inch.

The noncomposite body 11 having a plurality of holes 12 of such capillary dimensions, arranged in a layer with lateral spacings of less than about 0.005 inch, is itself a novel and highly unconventional arrangement in the ceramic art. Bodies of titanate-type ceramic materials of the type illustrated in Fig. 1 have been made about an inch wide and having about 100 such holes arranged in a single layer. Even though these holes are of such small diameters, they are adapted to receive conductive electrode material in fluent form, as is the case when the electrode material is carried by a liquid, either dissolved therein or preferably in essentially colloidal suspension in the liquid.

Electrode structure is associated with the body 11, including conductive material affixed to the interior surfaces of the holes 12 to provide numerous parallel internal electrodes. As implied hereinabove, this conductive material inserted in the holes of the fired body may be introduced therein while in a fluent form by capillary action. It merely may coat the surfaces of the holes, leaving smaller openings through the middle of the holes, but ordinarily this conductive material substantially fills the holes. Accordingly the holes have been shown as solid dots appearing at the end of the body 11 as seen in Fig. 1 of the drawing. When a suspension of carbonaceous particles is used to cover the interior surfaces of the holes with conductive material, these internal electrodes are of a composition incapable of remaining in contact with the ceramic material and substantially unreacted at the firing temperature of the ceramic material. At ceramic-firing temperatures the carbonaceous material, instead of remaining in contact with the ceramic walls, would vaporize and escape, either unreacted or as carbon monoxide or dioxide. Attempts to form the raw ceramic body on and around metallic wires or strips, so that the holes are filled from the start by metallic material, are unlikely to give satisfactory results, because most, if not all, of the ceramic raw materials used in forming high permittivity bodies tend to exhibit high shrinkage during the ceramic-firing operation, resulting in severe cracking or disruption of the body during the firing cycle due to the unshrinking and incompressible nature of such metallic filaments. Moreover, most of the commercially available metallic materials cannot remain in contact with the ceramic material at its firing temperature without serious damage to, or degradation of, the metal or the ceramic, or both, due to reaction of the metal with the oxidic material making up the ceramic; silver wires and finely divided silver preparations tend to be impractical, when present during the ceramic-firing operation, for this reason.

The electrode structure associated with the longitudinally extensive body 11, shown in Fig. 1, includes not only the internal electrodes filling the holes 12 but also an external electrode 13. For convenience of illustration in Figs. 1 and 2 the thickness of the external electrode structure has been exaggerated considerably. As shown in Fig. 1, the electrode 13 extends entirely around the body 11 and covers all its external surfaces with the exception of a small margin near the front end of the body 11 as seen in Fig. 1 and a larger margin near the rear end of the body. The electrode 13 may be formed by immersing the body in a suspension of conductive particles similar to that used in providing the internal electrodes, the ends of the body being masked to prevent contact of the electrode 13 with the internal electrodes extending to both ends of the holes 12. Alternatively a so-called conductive paint which may be of a similar composition containing, for example, silver particles, but which may contain additionally a so-called ceramic flux, may be applied to these exterior surfaces of the body 11.

The larger margin at the rear end of the body 11 is provided to permit the application of a conductive material over that end of the body and extending for a short distance therefrom along the length of the body, a margin being maintained between the conductive material so applied and the exterior electrode 13. This additional conductive structure may be formed, when the internal electrodes are formed, simply by dipping one end of the body in the fluent conductive material to a depth of, for example, 0.15 inch. The conductive suspension travels up through the capillary holes 12 to the opposite end of the body in a few seconds and simultaneously coats the end of the body dipped therein and the outer surface of the body to the immersion depth. In this way the conductive band around one end of the body is in contact with the internal electrodes and provides a convenient connection thereto. This conductive band connected to the internal electrodes is designated 14 at the rear end of the body 11 in Fig. 1. When the internal and external conductive surfaces have been formed, as described hereinabove, they may be dried or fired at moderate temperatures. If the conductive layers contain the aforementioned ceramic flux, a portion of the electrode structure may be fired to develop vitreous characteristics therein and thus provide desirable mechanical properties in the adherent conductive material.

Terminal lead connections are provided to the electrode structure, including the internal electrodes, for applying electrical potenials across the electrode structure to store electrostatic energy in the ceramic material. Thus a lead wire 16 is affixed conductively to the exterior electrode 13, and a lead wire 17 is affixed conductively to the conductive band 14 to furnish a lead connection to the internal electrodes. The ends of the leads 16 and 17 form electrical terminals for the capacitor, and at least one terminal lead, specifically the lead 17, is connected individually to a large number of the internal electrodes, in this case to all of the internal electrodes. To provide satisfactory capacitor characteristics, when such holes of capillary dimension are relied on to provide part of the electrode structure, it is considered highly preferable to have enough holes so that the internal electrodes in at least about ten of the holes may be connected to a single terminal lead, in this case to the band 14 and lead 17.

In operation, the capacitor simply is connected through the leads 16 and 17 to a circuit or other source of an electrical potential difference, whereupon a charge flows through the lead 17 onto each and all of the internal electrodes 12 and a charge of opposite polarity flows through the lead 16 onto the exterior electrode 13. In this way the application of electrical potentials across the electrode structure stores electrostatic energy, which appears as electrical fields in the dielectric ceramic material between the internal and exterior electrodes, whereby electrostatic energy is stored in the regions of the high permittivity ceramic material adjacent to the holes 12.

The capacitor of the present invention includes a plurality of internal holes provided with conductive electrodes, and in the preferred embodiments of the invention numerous electroded internal holes are provided, so that the structure and the electrical characteristics of the capacitor including the ceramic body having the holes are very different from the structure and characteristics of the conventional ceramic capacitor having a tubular shape with a large internal hole. The structure involving numerous small holes arranged in a layer approximates the electrical function of hypothetical plate-like electrode occupying the space taken up not only by the holes but by the regions between them. As compared with a structure utilizing a single wide hole this multi-hole structure, however, has the advantages of great mechanical strength, nor is it necessary or desirable to leave a metallic material within the interior openings during the firing operation. The exterior wall thickness of the ceramic body, that is, the distance from the outermost portions of each hole to the exterior surface of the ceramic body, may be made quite small, for example within the range 0.005 to 0.010 inch, while still maintaining sufficient mechanical strength by virtue of the bridges of ceramic material between the holes. To obtain the benefit of the mechanical and electrical superiority of this arrangement, in particular a high capacitance in a small volume, numerous holes should be provided, so that, as mentioned hereinabove, one of the terminal leads, in this case the lead 17, can be connected individually to at least about ten of the internal electrodes. Taking the Fig. 1 arrangement as an example, when the thickness of the dielectric material above and below the layer of holes 12 is 0.007 inch on each side of holes and the ceramic material has a permittivity of about 6500, a capacitance of about 0.05 microfarad at a rating of about 100 working volts D.-C. may be obtained with an over-all thickness of 0.025 inch, an over-all width of 0.25 inch and an over-length of 1.0 inch, of which 0.75 inch is effective, the latter being the length of the electrode 13. Increasing the over-all length to 1.75 inch, for example, increases the capacitance to about 0.10 microfarad.

Figure 2:
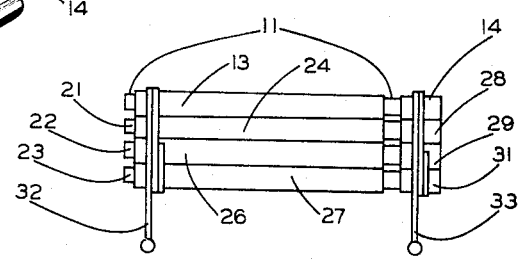
Fig. 2 is a view in elevation of a capacitor including a number of units of the type illustrated in Fig. 1.

To obtain higher capacitances at the same working voltage rating it may be convenient to arrange a structure thicker than that shown in Fig. 1, since there usually is room available for a thicker structure in an equipment of which the capacitor is a component. Referring to Fig. 2, there is shown in side elevation a composite structure comprising four capacitor units of the type shown in Fig. 1. Thus one of these capacitor units is identified by the ceramic body 11, the exterior electrode 13, and the end electrode 14 connected at the right end of the assembly to the internal electrodes, which are not visible in Fig. 2. Additional but identical ceramic bodies 21, 22, and 23, similarly having respective exterior electrodes 24, 26, and 27 and respective conductive end caps 28, 29, and 31, are arranged in a stack with the exterior electrodes 13, 24, 26, and 27 and the respective conductive caps 14, 28, 29, and 31 in side to side contact. Each of the ceramic bodies 11, 21, 22, and 23 thus is provided with conductive electrode structure individually identical with that of the Fig. 1 arrangement, except for the omission of the leads 16 and 17. In the place of these leads there are provided in the Fig. 2 arrangement a common lead connection 32, wrapped around the electrodes 13, 24, 26, and 27 of the stack of capacitor units and in contact with each of these electrodes at the sides thereof, and another terminal lead connection 33 wrapped around the conductive caps 14, 28, 29, and 31 in like manner so as to contact each and all of the internal electrodes in all four of the capacitor units. In this way, assuming that each capacitor unit is one inch long and has the other dimensions given hereinabove by way of example for the capacitor illustrated in Fig. 1, a capacitance of about 0.20 microfarad is obtained in a compact arrangement having high electrical and mechanical strength.

Fig. 3 is a perspective view of a modified ceramic body, which may be used in place of the body 11 as shown in either of Figs. 1 or 2. The body 36 of Fig. 3 is a noncomposite body of high permittivity ceramic material having numerous parallel holes 37 of generally rectangular cross-sectional shape arranged in a single layer. The holes 37 are of capillary size in the smaller internal dimension thereof, that is, the thickness dimension of the holes. Although the electrode structure is not shown in Fig. 3, the exterior surfaces of body 36 and each of the holes 37 are provided with conductive electrodes, so that this electrode structure preferably fills the holes 37 and includes an exterior electrode arranged similarly to the electrode 13 shown in Fig. 1. Likewise a conductive end cap, similar to the cap 14 shown in Fig. 1 and extending over one end of the body 36 into contact with the internal electrodes, also may be provided for the body 36. In spite of the greater width of the rectangular holes, there is no difficulty in filling the holes with a fluent conductive material because of the capillary thickness of the holes. If the body 41 with its electrodes is to be used as a single unit, lead connections similar to the leads 16 and 17, shown in Fig. 1, also may be provided.

As an example, the body 36 may have 12 holes, each about 0.050 inch in width and 0.008 inch in thickness, adjacent pairs being separated by about 0.004 inch of ceramic material to give an over-all width of about 11/16 inch. With an over-all thickness of .025 inch, including exterior electrodes, and an over-all length of 1¾ inches, a capacitance of over 0.25 microfarad can be obtained when the permittivity of the ceramic material is 6,500. If four such capacitor units are arranged in stacked relationship and provided with leads in the manner illustrated in Fig. 2, a capacitance of 1.0 microfarad at a rating of 100 working volts D.-C. may be obtained in an assembly only 5/32 inch thick, ¾ inch wide, and less than 2 inches long, having an over-all volume of ⅛ cubic inch. The finished unit, when made amply strong mechanically and protected externally, for example by dipping in a phenolic resin and curing, may have an over-all volume perhaps two or even three times as great, since the unfinished dimensions are so small, but the ratio of capacitance to volume of the finished assembly is still advantageously high. It will be evident that capacitances of the order of 10 microfarads easily may be obtained in a reasonable space with capacitors of the type herein described, simply by making multi-hole ceramic bodies of larger dimensions or by making a compact bundle of such capacitor units as shown in Fig. 2.

Figure 5:
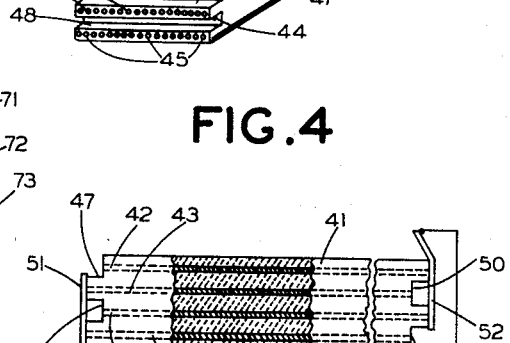
Fig. 5 is a front or lengthwise elevation of the body illustrated in Fig. 4, including an arrangement of terminal lead connections for the electrode structure with which that body is provided.

Turning now to Figs. 4 and 5 of the drawing, Fig. 4 illustrates in perspective a noncomposite ceramic body 41 having numerous parallel holes in the material which are generally circular and of capillary cross-sectional dimensions and which are arranged in a plurality of layers, specifically four layers. The uppermost layer of holes 42 lies in a plane near the upper external surface of the body 41. Below the layer 42 is a second layer 43, arranged similarly to the holes 42 but separated therefrom by an unbroken layer of ceramic material which may be some 0.018 inch in thickness. Two additional similar layers of holes 44 and 45 are arranged below the layer 43 with similar separations, the layer 45 lying near the lower external surface of the body 41. Most of the layer of holes 44 are hidden in the view of Fig. 4. The spacing between adjacent holes in the individual layers may be considerably smaller, as mentioned hereinabove in connection with the Fig. 1 arrangement, so that the holes in each of the layers 42–45 are relatively closely spaced while the layers are relatively widely spaced from each other.

To facilitate lead connections to electrodes which are inserted in the holes of each layer, the upper edge of one end of the body 41 is cut or ground down to form an indentation 47 along a plane midway between the holes 42 and the holes 43, while a notch 48, centered upon the holes 44, is machined into the same end of the body to isolate the ends of the holes 44 from the ends of the holes 43 and 45. At the other end of the body 41 an indentation 49 including the holes 45 is machined into the lower edge of the body, while the holes 43 are separated from the holes 42 and 44 by a notch 50.

Referring to the side elevation view of Fig. 5, the body 41 is viewed with the layers of holes 42–45 seen on edge, as indicated by dashed lines. Fig. 5 is drawn to a larger scale than is Fig. 4 and is shown with a portion of its length cut out. In the sectionalized portion of Fig. 5 it appears that each of the holes in these layers is filled with a conductive material inserted to provide effectively numerous parallel internal electrodes. In the embodiment illustrated in Figs. 4–5 no external electrode is provided. A thin lead connection plate 51 is cemented conductively across the forward end of the body 41 so that it is in contact with the ends of the layers of holes 43 and 45 but is separated and insulated from the layers of holes 42 and 44, due to the fact that the latter layers of holes are depressed below the surfaces touched by the plate 51 by virtue of the indentation 47 and the notch 48. Similarly at the rearward end of the body 41 a conductive lead connection plate 52 is affixed in conductive contact with the ends of the holes 42 and 44 but separated from the holes 43 and 45 by virtue of the notch 49 and the indentation 50. The terminal lead connections are completed by lead wires 53 and 54, connected respectively to the connection plates 51 and 52 and leading to a pair of terminals. In this way the terminal lead connections to the electrode structure include interconnections for the conductive material in each of the holes in each layer of holes to form effectively an internal layer electrode.

When a source of electrical potential is connected across the terminals and the leads 32 and 33, the capacitor receives charges of one polarity on the electrodes in the holes 43 and 45 through the lead connections 53 and 51 and receives charges of the other polarity on the electrodes in the holes 42 and 44 through the lead connections 54 and 52. Thus the terminal lead connections not only are arranged, for each individual layer of the holes, to interconnect the internal electrodes thereof to form effectively an internal layer electrode, but also are arranged to connect any two adjacent ones of these effective internal layer electrodes to different terminal leads.

Numerous modifications of the electrode arrangements and interconnections will occur to those skilled in the art. For example, in an arrangement similar to that illustrated in Figs. 4 and 5 but with three layers of holes instead of four, the electrodes in the central layer could be connected to a ground terminal while the electrodes in the other two layers could be connected to separate individual terminals intended for connection to two different voltage sources, which might be sources of voltages of opposite polarities. In the arrangement last suggested, an exterior electrode could be provided encircling the central portions of the body 41 and connected to the same terminal as are the electrodes forming the central layer of holes.

Referring now to Figs. 6 and 7, there is illustrated a capacitor comprising a noncomposite ceramic body 61 having numerous parallel holes which are arrayed in a two-dimensional spaced relationship. As illustrated, a square pattern of holes 62 is provided, including six holes in each of six layers. A cross section through the body 61 thus discloses six rows and six columns of holes, thirty-six in all. As with the arrangements illustrated in the other figures of the drawing, these holes may be formed by pulling through a suspension of raw ceramic material numerous unrefractory filaments or strips, maintained during the pulling in a spatial relationship corresponding to that of the holes desired in the fired body. In the arrangement of Fig. 6 the holes in each row and column may be about 0.008 inch in diameter and separated by a hole spacing of about 0.018 inch, giving an over-all square cross-sectional shape about 0.17 inch on a side.

Diagonal notches are machined into the ends of the body 61, as illustrated in Fig. 6, so that the hole near the upper right-hand edge of the body 61 terminates at its forward end on a depressed surface 63, while the hole near the lower left-hand edge of the body terminates at its forward end in a depression 64. Four additional diagonal notches 66, 67, 68, and 69 are formed across the forward end of the body 61 so as to isolate the forward ends of the holes by depressing the ends in alternate diagonal groups between the depressions 63 and 64. A corresponding arrangement of notches is machined into the rearward end of the body 61, but with the holes nearest the upper right-hand edge and the lower left-hand edge of the body having their rearward terminations on raised portions and with a series of diagonal notches 71, 72, 73, 74, and 75 therebetween isolating the rearward terminations of the holes in alternate diagonal rows. Conductive material is inserted in the capillary holes to provide a total of 36 parallel internal electrodes affixed to the interior surfaces of the holes.

Referring to Fig. 7, a side view is given on a somewhat reduced scale of the body 61 as viewed looking along the diagonal plane which includes the lower right-hand edge and the upper left-hand edge of the body as seen in Fig. 6. Lead connection plates 76 and 77 are affixed conductively against the exposed portions of the forward and rearward ends respectively of the body 61, so that the electrodes in the holes of the odd-numbered diagonal rows are interconnected by the plate 76, while the electrodes in the holes of the even-numbered diagonal rows, including the central diagonal row of six holes, are interconnected by the plate 77. Lead wires 78 and 79 are connected to the plates 76 and 77 respectively and lead to a pair of terminals. It will be seen that these terminal lead connections interconnect the internal electrodes in the holes 62 in two groups in such a manner that the electrodes in any two most closely adjacent ones of the holes 62 are connected to different terminal leads 78 and 79. In other words, viewing the array of holes as seen at the forward end of the body 61 in Fig. 6, the electrode in any hole which is not adjacent to an outer surface of the body is surrounded by the electrodes in four most closely adjacent holes, namely the nearest hole in each of the two adjacent rows of holes and the nearest hole in each of the two adjacent columns of holes, each of which is connected to the other terminal lead by virtue of the diagonal arrangement of the terminal lead connections.

In use as a capacitor, the arrangement of Figs. 6 and 7, assuming the dielectric to be a high permittivity ceramic material of the type mentioned specifically hereinabove, provides a capacitance of about 0.1 microfarad at a voltage rating of about 100 working volts D.-C. with a body having over-all dimensions of about 3/16 inch by 3/16 inch by 2 inches. In designing a capacitor of this type the ratio of the diameter of the holes to their separation may be varied, of course, and an especially high capacitance per unit over-all volume may be obtained at a given working voltage rating by increasing the ratio of hole diameter to center-to-center spacing to about 0.56. Thus, if a hole spacing between rows and columns of 0.011 inch with correspondingly lower voltage rating is desired, a hole diameter of 0.014 inch and a center-to-center spacing of 0.025 inch would be recommended.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

What is claimed is:

1. A capacitor of high permittivity ceramic material, comprising: a noncomposite body of such material fired to ceramic maturity and having a plurality of generally circular parallel holes of capillary cross-sectional dimensions which are arranged in a layer, said holes in said layer of holes being so closely spaced that the lateral distance between adjacent holes in said layer is less than the average diameter of said capillary holes; electrode structure associated with said body, including conductive material affixed to the interior surfaces of said holes; and terminal lead connections to said electrode structure, including interconnections for said conductive material in each of said closely spaced holes to form effectively an internal layer electrode, for applying electrical potentials across said electrode structure to store electrostatic energy in regions of said high permittivity ceramic material adjacent to said holes.

2. A capacitor of high permittivity ceramic material, comprising: a noncomposite body of such material fired to ceramic maturity and having a plurality of generally circular parallel holes of capillary cross-sectional dimensions which are arranged in a layer, said holes in said layer of holes being so closely spaced that the lateral distance between adjacent holes in said layer is less than about 0.005 inch; electrode structure associated with said body, including conductive material affixed to the interior surfaces of said holes; and terminal lead connections to said electrode structure, including interconnections for said conductive material in each of said closely spaced holes to form effectively an internal layer electrode, for applying electrical potentials across said electrode structure to store electrostatic energy in regions of said high permittivity ceramic material adjacent to said holes.

3. A capacitor of high permittivity ceramic material, comprising: a noncomposite body of such material fired to ceramic maturity and having numerous parallel holes of capillary cross-sectional dimensions which are arranged in at least one layer; electrode structure associated with said body, including conductive material affixed to the interior surfaces of said holes; and terminal lead connections to said electrode structure, including interconnections for said conductive material in each of said holes in said layer of holes to form effectively an internal layer electrode, for applying electrical potentials across said electrode structure to store electrostatic energy in regions of said high permittivity ceramic material adjacent to said holes.

4. A capacitor of high permittivity ceramic material, comprising: a noncomposite body of such material fired to ceramic maturity and having in said material numerous parallel holes which are of capillary cross-sectional dimensions and which are arranged in a plurality of layers, said holes in each such layer being relatively closely spaced and said layers being relatively widely spaced; conductive material affixed to the interior surfaces of said holes to provide numerous parallel internal electrodes; and terminal lead connections arranged, for each individual layer of said holes, to interconnect said internal electrodes thereof to form effectively an internal layer electrode, but arranged to connect any two adjacent ones of said effective internal layer electrodes to different terminal leads.

References Cited in the file of this patent

UNITED STATES PATENTS

| | | |
|---|---|---|
| 2,793,333 | Ehlers | May 21, 1957 |

FOREIGN PATENTS

| | | |
|---|---|---|
| 482,459 | Great Britain | Mar. 30, 1938 |
| 736,856 | Germany | June 30, 1943 |